April 9, 1968    F. WELCKER    3,377,045
ROTARY FIELD-CONTROLLED SPRING VALVE
Filed July 9, 1964    2 Sheets-Sheet 1

INVENTOR:
F. Welcker
BY
Richards & Geier
ATTORNEYS

United States Patent Office

3,377,045
Patented Apr. 9, 1968

3,377,045
ROTARY FIELD-CONTROLLED SPRING VALVE
Friedrich Welcker, 6 Fritz-Reuter-Weg,
Letmathe, Germany
Filed July 9, 1964, Ser. No. 381,426
Claims priority, application Germany, July 24, 1963,
W 34,949
8 Claims. (Cl. 251—48)

This invention relates to a spring actuated valve assembly and refers more particularly to a rotary spring valve adapted for use in pipes and automatically controlled by physical variable quantities, such as pressure, temperature, brightness, resistance, and the like, whereby the automatic control of the valve may consist in releasing, reversing, throttling or blocking it in accordance with the function which it is intended to perform.

Industrial plants, particularly large ones, often require the remote control of various valve assemblies. Similarly it is advisable to provide a control of the heating of living quarters so as to provide at all times a physically favorable environment by automatically regulating heating installations connected to a centrally situated heat supply in accordance with the temperature requirements of the individual rooms.

In order to maintain a specific room temperature on a level which should be as constant as possible, it is now customary to replace manual regulation which has been used in the past by automatic thermostatic control. By way of example, a motor valve may be electrically remotely controlled by a temperature-sensing device which will control a heater located somewhere in the room.

In prior art, valve motors were used which are capable of being reversed and which require a comparatively large number of electrical control devices, including limit switches, reversing contactors, coupling or release magnets and a corresponding number of conducting wires. These devices require a substantial amount of space and a great deal of installation work. They necessarily include numerous sources of difficulties and require regular careful maintenance in order to assure reliable operation.

An object of the present invention is to improve such prior art devices.

Other objects will become apparent in the course of the following specification.

In the accomplishment of the objectives of the present invention it was found desirable to provide a valve arrangement stressed by a spring in one direction which is similar to the familiar safety valve used on steam boilers and opening automatically when steam pressure within the boiler becomes excessive. In accordance with the present invention the device has a valve shaft which can be actuated by an electrical rotary-field magnet in opposition to the action of the valve spring. The rotary magnet is constructed so that it operates against a fixed stop. Thus it is particularly suited to control hydraulic valves which must be under remote control. According to the present invention the rotary magnet is actuated by a standard room thermostat if the temperature in the vicinity of the thermostat drops below a predetermined value. As soon as the required room temperature has been obtained, the thermostat again cuts off the rotary magnet which stops in the end setting of the valve. The magnet is electrodynamically designed so that it will remain energized without the danger of being damaged, whereby the torque stops acting on the valve shaft so that the valve shaft returns to its original position, being driven by the valve spring. Thus according to the invention the valve system is either open, reversed or closed, whereby the rotary magnet simultaneously executes a return motion in a direction opposed to its normal direction of rotation. This forced return motion of the present invention is a substitute for an elaborate reversal of the drive unit which was necessary in prior art constructions.

According to another feature of the present invention a uniform overall effect is attained by providing the coupling member between the rotary magnet and the spring-stressed valve shaft with a play or idle motion of such type that the driving member of the coupling moves back beyond the actual point of contact under the action of the spring to an extent sufficient to assure a securely sealed seating of the valve bearing.

Furthermore according to the invention, it is advantageous to use a retarding device serving as a return motion brake for the purpose of considerably reducing the noise produced by the loadless return motion of the rotary valve and of a reduction gear which may be coupled with it, since such noise could be considered as objectionable, particularly in the case of short regulation cycles in living rooms or bedrooms. It should be noted in this connection that the use of a reduction gear between the valve and the magnet may be desirable to keep the torque as well as the size of the construction as small as possible.

According to a further feature of the present invention the minimal pre-stress of the restoring spring of a shaft having a straight travel movement takes full effect in the inoperative position of the actuating assembly so as to warrant that the valve will function reliably. For this purpose the actuating member for the valve shaft returns somewhat beyond the last point of contact as well as the following point of impact after the restoring process has been completed and it must be lifted off slightly from the corresponding coupling member. For this purpose and in order to assure that the actuating procedure which takes place in the opposite direction be effected as smoothly as possible, the actuating member of the valve shaft is connected to the reduction gear by a lever coupling which actuates in a manner similar to that of a hinged lever and causes a roller to slide on a flattened head of the valve shaft, whereby this shaft portion also serves as a retaining device for the valve spring. The design can be changed so that when the restoring procedure is completed, an actuating member on the reduction gear acts on an electrical contacting or switching device. This contacting is used for signaling or to control any subsequent procedure, such as the use of a recirculating pump.

The same results can be achieved with a valve shaft carrying out a screw-type motion by the use of a suitable coupling device. In that case the restoring force of the valve shaft emerging from the valve system with a screw-type motion is transferred by a helical torsion spring or radial spring. To save space this spring is wound around the drive shaft of the reduction gear connected to the rotary magnet and does not engage the valve shaft until after the coupling. The slot coupling used for this purpose must have sufficient play but it is small as compared to the above-described lever type coupling.

The parts provided inside the valve system in connection with the shaft include a shaped member stabilized on both sides by metal plates and consisting of rubber, plastic or other type of material, depending upon the substance the flow of which is to be regulated by the valve.

According to a further feature of the present invention the greatest possible adaptation of the valve assembly to the required operating conditions and its possible modifications is attained by making adjustable the extent of movement of the valve and thus the size of the gasket opening by the use of a block for a valve plate having the shape of an adjustable stop.

The invention will appear more clearly from the following detailed description when taken in connection with the accompanying drawings, showing by way of example, preferred embodiments of the inventive idea.

Figure 2:
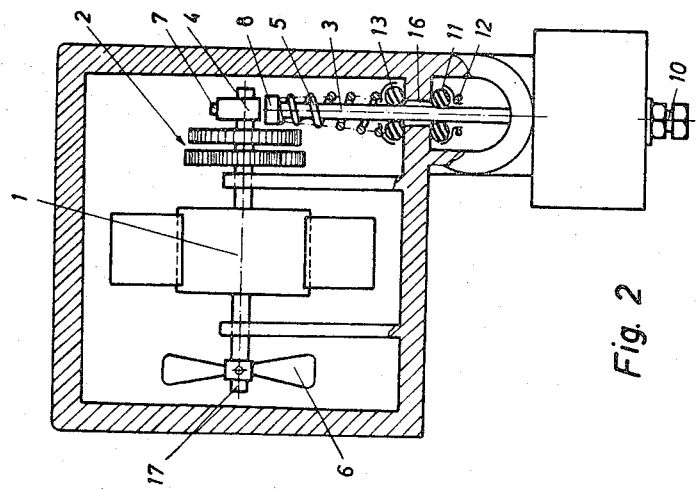
FIGURE 2 is a transverse section through the valve shown in FIG. 1.
Figure 1:
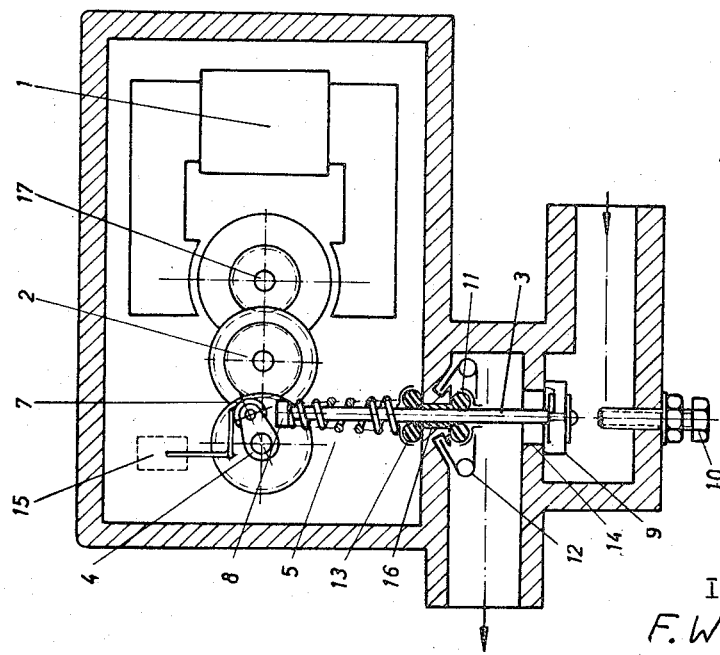
FIGURE 1 is a longitudinal section through a rotary spring valve constructed in accordance with the principles of the present invention.

FIGS. 1 and 2 illustrate a rotary spring valve using a straight travelling shaft. The rotary magnet system of the device can be used for the remote control of a blocking valve of any suitable type. The rotary magnet system can be controlled remotely by any suitable switching or regulating device, such as a thermostat of the usual type located elsewhere at a suitable location, whereby the controlling is carried out electrically by any suitable electrical means known in the art and not disclosed in detail.

FIGS. 1 and 2 show a rotary magnet 1 mounted on a shaft 17 and connected by a suitable reduction gear 2 with a member 4 actuating an axially movable valve shaft 3. The shaft 3 is enclosed by a helical tension spring 5 which exerts pressure upon the shaft 3 so as to keep it normally in an inoperative position and so as to restore it to an inoperative position when the rotary magnet 1 is inoperative.

To facilitate this operation the rotary magnet 1 is preferably a suitably dimensioned non-synchronous motor capable of producing a starting torque which is sufficient to overcome the opposing force produced by the valve and on the other hand to produce a peak torque when the valve is in its operative position as the result of actuation, whereby the magnet in the operative position can remain stationary and energized without being damaged.

If the rotary magnet 1 is so constructed that it will be able to remain energized in the operative position indefinitely and without becoming overheated, then it is not necessary to provide any special ventilating means in addition to those normally used in designing valve casings. However, while the reduction gear 2 used to attain a higher torque provides a simpler model, it can produce comparatively quick rotation during the return movement to the inoperative position under the influence of the spring and therefore the present invention provides means for avoiding objectionable operating noises. Such means may consist of a fan 6 serving as a retarding device and mounted upon the shaft 17 of the magnet, since the shaft is the part which has the fastest rate of rotation. The fan 6 also serves for ventilation.

The braking force produced by the fan 6 is matched by the coupling effect between the magnet 1 with the reduction gear 2 and the spring-stressed valve shaft 3. The actuating member 4 must move freely beyond the last point of contact with the flat head 8 of the valve shaft 3 while the valve shaft 3 is returned to its inoperative position in order that the residual stress or prestress of the helical spring 5 should be able to act with its full force and effect the proper functioning of the valve.

In order to attain this result the actuating member 4 has the shape of a hinged lever and carries a rotary roller 7 upon its free end. At the beginning of each actuation process and after the release of the usual contact switch 15 by any suitable means (not shown), the roller 7 comes in contact with the flattened head 8 of the valve shaft and rolls along its surface during the hinged motion of the lever 4, causing the valve shaft 3 to be displaced in the direction of the valve system so as to release a valve opening or perform any other desired valve function.

For this purpose the adjustable element of the valve consists of a shaped sealing device 9 made of rubber, an elastic plastic substance or any other suitable material.

The sealing device 9 is stabilized by the use of metal plates which engage its opposite sides. In the normal position the sealing device 9 firmly engages the valve seat 14. The extent of travel of the valve shaft and thus the size of the opening can be adjusted in accordance with the prevailing requirements by the use of a mechanical stop 10 having the shape of a screw extending into the valve chamber through a wall in the casing.

The interior of the valve chamber is sealed off against the shaft 3 by an elastic gasket 11 which is held in place by springs 12. The springs 12 are anchored to the valve casing and their sealing action is enhanced by the pressure of the medium in the conduit.

This sealing action is further enhanced by a similar unit located inside the valve chamber and consisting of sealing gaskets 13 which in that case can be held in place merely by the valve spring 5. The spring 5 then extends beyond its support to press the gaskets 13 against the area between the casing bore 16 and the valve shaft 3.

The operation of this valve is apparent from the above description.

Figure 3:
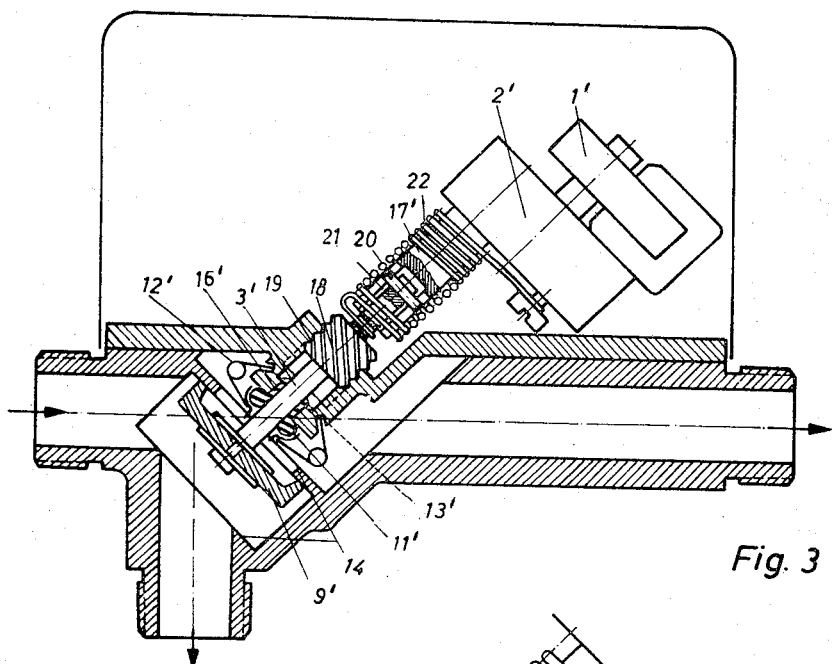
FIGURE 3 is a section through a differently constructed valve, some parts being shown in side elevation.
Figure 4:
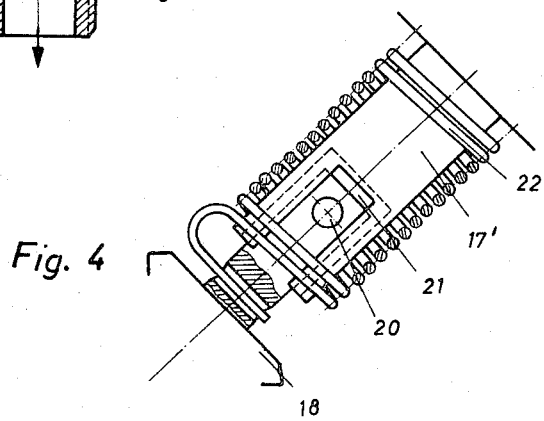
FIGURE 4 shows, partly in section, a detail of the construction of the valve shown in FIG. 3.

FIGS. 3 and 4 show a somewhat different construction, wherein the valve shaft carries out a helical motion. This device provides a greater positioning length of valve travel. This construction includes rotary magnet 1' which actuates a valve shaft 3' by means of a reduction gear 2'. A pinion 18 is rigidly mounted upon the shaft 3 and meshes with a threaded member 19 which may constitute a part of the casing. In this construction the rotary magnet 1' in its stationary and permanently energized position provides sufficient torque for the valve seating which is thus reliably maintained. This construction also shows a standard slot coupling between the drive shaft 17' and the valve shaft 3' so that the axial shift of the valve shaft 3' is taken up without tension and so that there is sufficient play between a cross-pin 20 and a slotted sleeve 21 coupled to the cross-pin. Thus the valve shaft 3' after having completed its return motion has sufficient space to provide the effects described in connection with the embodiment shown in FIGS. 1 and 2.

In the construction of FIGS. 3 and 4 the restoring spring for the valve shaft 3' has the shape of a helical torsion spring 22 which is firmly connected to the casing at the end nearest to the reduction gear 2'. The spring 22 is wound around the shaft 17' of the reduction gear 2'. It has a certain amount of prestress and engages the valve shaft 3' past the slot coupling 20, 21.

In this construction the threaded assembly 18, 19 can provide a sufficient sealing effect. However, it is also possible to provide a sealing gasket 13' which may be spring mounted against the pinion 18. Furthermore in this construction, the additional device retarding the return motion is eliminated since the threaded assembly has an adequate retarding effect as constitutes the braking device.

It is apparent that the two above described embodiments of the present invention have the common feature of providing an electrically controlled regulating element operating against a fixed stop or arresting surface constituting a valve seat. The regulating element has the purpose of remotely controlling hydraulic elements. It has enough torque so that it can remain continuously energized in the arrested state. For this purpose the regulating element transmits its torque through a self-retarding member and acts as a motor-type drive to overcome the force of the spring assembly. When the spring assembly is compressed the regulating element can remain energized and returns to its initial position only after the supply of electrical current has been cut off. The coupling and damping devices of the present invention both diminish the noise caused by the return motion.

It is apparent from the above description that the devices of the present invention can be used effectively for the heating of rooms and can also be used for a large number of different applications, particularly of the industrial type, where they can replace the existing complicated devices. The valves of the present invention can be adapted to any prevailing conditions or requirements. They can be installed in any position in existing conduit systems.

It is also apparent that the described constructions are capable of various modifications without exceeding the scope of the invention.

I claim:

1. A rotary spring valve, comprising a rotary magnet having a shaft; a reduction gear connected with said shaft, an actuating member connected with said reduction gear, a movable valve shaft having a member located adjacent said actuating member and adapted to be engaged thereby, a spring engaging the second-mentioned member, and a braking device connected with the first-mentioned shaft and adapted to retard the speed of the first-mentioned shaft during the closing movement of said valve shaft, wherein said braking device consists of a fan assembly.

2. A rotary spring type valve in accordance with claim 1, further comprising a casing for said magnet and means connected with said casing and constituting a valve chamber, said casing having an opening for said valve shaft which extends through said valve chamber and into said casing, an elastic gasket and a spring connected with said casing and supporting said gasket within said valve chamber and over said opening to close said opening.

3. A rotary spring type valve in accordance with claim 2, further comprising another gasket located within said casing and over said opening, said other gasket being connected with the first-mentioned spring.

4. A rotary spring type valve in accordance with claim 1, further comprising valve holding means having an elastic valve plate carried by said valve shaft and metal plates on opposite sides of said valve plate, said valve holding means limiting the movement of said valve shaft.

5. A rotary spring type valve in accordance with claim 4, wherein said valve holding means further comprise an adjustable stop member.

6. A rotary spring type valve in accordance with claim 1, wherein the first-mentioned member consists of a lever coupling.

7. A rotary spring type valve in accordance with claim 6, wherein said lever coupling comprises a hinged lever connected to said reduction gear and a roller carried by a free end of said lever, and wherein the second-mentioned member consists of a flat head adapted to be engaged by said roller.

8. A rotary spring type valve in accordance with claim 7, further comprising a switch connected with said hinged lever for releasing said lever and causing said roller to engage said flat head.

References Cited

UNITED STATES PATENTS

| | | | |
|---|---|---|---|
| 1,903,229 | 3/1933 | Colman et al. | 251—134 X |
| 2,723,830 | 11/1955 | Markley | 251—134 |
| 3,137,475 | 6/1964 | Schoenecker et al. | 251—133 X |

FOREIGN PATENTS

| | | |
|---|---|---|
| 717,884 | 2/1942 | Germany. |
| 963,698 | 7/1964 | Great Britain. |

M. CARY NELSON, *Primary Examiner.*

R. C. MILLER, *Assistant Examiner.*